(12) United States Patent
Auburger et al.

(10) Patent No.: US 9,801,351 B2
(45) Date of Patent: Oct. 31, 2017

(54) MILKING OF ANIMALS WITH REDUCED TEAT STRESS

(71) Applicant: GEA Farm Technologies GmbH, Bonen (DE)

(72) Inventors: Markus Auburger, Lippstadt (DE); Martin Neumann, Oelde (DE); Thomas Orban, Dortmund (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 14/217,277

(22) Filed: Mar. 17, 2014

(65) Prior Publication Data

US 2015/0040831 A1    Feb. 12, 2015

Related U.S. Application Data

(63) Continuation of application No. 12/451,408, filed as application No. PCT/EP2008/055852 on May 13, 2008, now Pat. No. 8,671,886.

(30) Foreign Application Priority Data

May 11, 2007  (DE) ........................ 10 2007 022 801
Nov. 14, 2007 (DE) ........................ 10 2007 054 725

(51) Int. Cl.
    *A01J 5/00*    (2006.01)
    *A01J 5/04*    (2006.01)
    *A01J 5/06*    (2006.01)

(52) U.S. Cl.
    CPC ...... *A01J 5/044* (2013.01); *A01J 5/06* (2013.01)

(58) Field of Classification Search
    CPC .... A01J 5/041; A01J 5/044; A01J 5/06; A01J 5/08; A01J 5/04
    (Continued)

(56) References Cited

U.S. PATENT DOCUMENTS 289,546 A    12/1883   Martin
870,785 A    11/1907   Jacques
(Continued)

FOREIGN PATENT DOCUMENTS

DE    3217865      1/1983
DE    3429428      11/1985
(Continued)

OTHER PUBLICATIONS

U.S. Appl. No. 60/928,847, filed May 11, 2007.
(Continued)

*Primary Examiner* — David Parsley
*Assistant Examiner* — Danielle Clerkley
(74) *Attorney, Agent, or Firm* — Smith Law Office; Jeffry W. Smith

(57) ABSTRACT

The invention relates to a milking unit comprising a milk collection part and at least two milk tubes that are connected to the milk collection part. At least one end of the milk tube has an essentially spherical clamping body, the central point of the clamping body being offset in relation to the longitudinal axis (S) of the milk tube and/or the clamping body having a channel with a mouth. The longitudinal axis (S) penetrates a plane, on which the cross-sectional surface of the mouth lies at an angle that is not equal to 90°.

5 Claims, 16 Drawing Sheets

(58) Field of Classification Search
USPC .......... 119/14.47, 14.48, 14.51, 14.54, 14.46
See application file for complete search history.

(56) References Cited

U.S. PATENT DOCUMENTS

| | | | |
|---|---|---|---|
| 970,816 | A | 9/1910 | Hankins |
| 1,111,978 | A | 9/1914 | Uebler |
| 1,358,667 | A | 11/1920 | Williams et al. |
| 1,700,025 | A | 1/1929 | Cockburn |
| 1,822,680 | A | 9/1931 | Taylor |
| 2,099,884 | A | 11/1937 | Green |
| 2,639,840 | A | 5/1953 | Wons |
| 2,690,734 | A | 10/1954 | Heckendorf |
| 2,694,379 | A | 11/1954 | Hein |
| 3,212,681 | A | 10/1965 | Weikert |
| 3,461,845 | A | 8/1969 | Peterson |
| 4,324,201 | A | 4/1982 | Larson |
| 4,516,592 | A | 5/1985 | Schultz et al. |
| 4,745,881 | A | 5/1988 | Larson |
| 4,756,275 | A | 7/1988 | Larson |
| 4,869,205 | A | 9/1989 | Larson |
| 4,924,809 | A | 5/1990 | Verbrugge |
| 5,080,041 | A | 1/1992 | Steingraber |
| 5,125,909 | A | 6/1992 | Heimberger |
| 5,435,916 | A | 7/1995 | Schwartz |
| 5,572,947 | A | 11/1996 | Larson et al. |
| 5,848,738 | A | 12/1998 | Sundby et al. |
| 5,934,222 | A | 8/1999 | Hwang |
| 6,039,001 | A | 3/2000 | Sanford |
| 6,427,624 | B1 | 8/2002 | Briggs et al. |
| 6,742,475 | B1 | 6/2004 | Mcleod et al. |
| 6,895,890 | B1 | 5/2005 | Maier, Jr. |
| 6,895,891 | B2 * | 5/2005 | Maier, Jr. ............... A01J 5/044 119/14.51 |
| 6,895,892 | B2 | 5/2005 | Sellner et al. |
| 6,997,136 | B1 | 2/2006 | Coates |
| 7,121,590 | B1 | 10/2006 | Alveby |
| 7,395,780 | B2 | 7/2008 | Maier, Jr. et al. |
| 7,578,260 | B2 | 8/2009 | Shin |
| 7,637,228 | B2 | 12/2009 | Hatzack et al. |
| 7,650,854 | B2 | 1/2010 | Petterson et al. |
| 7,827,933 | B2 | 11/2010 | Van Den Berg |
| 8,033,247 | B2 | 10/2011 | Torgerson et al. |
| 8,671,886 | B2 | 3/2014 | Auburger |
| 2004/0025794 | A1 | 2/2004 | Maier et al. |
| 2004/0060520 | A1 | 4/2004 | Sellner et al. |
| 2005/0160993 | A1 * | 7/2005 | Hatzack ............ A01J 5/044 119/14.54 |
| 2005/0223999 | A1 * | 10/2005 | Maier, Jr. ............ A01J 5/041 119/14.47 |
| 2007/0137582 | A1 | 6/2007 | Boast |
| 2008/0006211 | A1 | 1/2008 | Van Den Berg |
| 2008/0276871 | A1 | 11/2008 | Auburger et al. |
| 2008/0289579 | A1 | 11/2008 | Auburger et al. |
| 2008/0308043 | A1 | 12/2008 | Hatzack et al. |
| 2009/0050062 | A1 | 2/2009 | Auburger et al. |
| 2010/0126422 | A1 | 5/2010 | Auburger et al. |
| 2010/0275849 | A1 | 11/2010 | Wulle et al. |
| 2014/0158053 | A1 | 6/2014 | Auburger |

FOREIGN PATENT DOCUMENTS

| | | |
|---|---|---|
| DE | 10207955 | 9/2003 |
| DE | 10212161 | 10/2003 |
| EP | 1872653 | 1/2008 |
| GB | 552476 | 4/1943 |
| GB | 784008 | 10/1957 |
| GB | 1197747 | 7/1970 |
| GB | 2145915 | 4/1985 |
| WO | 00/69252 | 11/2000 |
| WO | 2007/022950 | 3/2007 |
| WO | 2008/138931 | 11/2008 |
| WO | 2009/147369 | 12/2009 |

OTHER PUBLICATIONS

U.S. Appl. No. 12/152,076, filed May 12, 2008.
U.S. Appl. No. 14/162,846, filed Jan. 24, 2014.
Office Action dated Nov. 4, 2011; U.S. Appl. No. 12/152,000.
PCT/EP08/055852, ISR, IPRP, WO dated Dec. 31, 2009, 13 pages.
Restriction Requirement dated Nov. 21, 2011; U.S. Appl. No. 12/451,408.
Amendment dated Dec. 21, 2012; U.S. Appl. No. 12/451,408.
Preliminary Amendment dated May 21, 2012; U.S. Appl. No. 12/451,408.
Response to the Feb. 19, 2016 Office Action filed Jul. 13, 2016, U.S. Appl. No. 14/090,818, 8 pages.
Final Office Action dated Sep. 9, 2016, U.S. Appl. No. 14/090,818, 9 pages.

* cited by examiner

MILKING OF ANIMALS WITH REDUCED TEAT STRESS

FIELD AND BACKGROUND OF THE INVENTION

The subject of the invention relates to a milk tube, a milking unit comprising a milk collection piece and at least two milk tubes connected to the milk collection piece, a milking cup comprising a milking cup sleeve, in which a teat liner is arranged, and a milk tube connected to the teat liner, and also a milking appliance comprising a milk collection piece, at least two milking cups which have in each case a milking cup sleeve and a teat liner arranged in the milking cup sleeve, and milk tubes which connect the milking cups to the milk collection piece.

Although the invention is described below in relation to the milking of cows, it is pointed out that the subject of the invention is suitable especially for use in the milking of sheep, goats, llamas, camels, dromedaries, buffalos, mares, donkeys, yaks and other milk-dispensing animals. The invention may be employed both in robot-assisted milking installations and in fully automatic, semiautomatic and conventional milking installations.

To milk an animal, it is necessary for the milking cups to be attached to the teats of an animal. The attachment of the milking cups may take place robot-assisted. It is also known to attach milking cups to the teats of the animal manually. The milking cups have a teat liner which is arranged in a milking cup sleeve. The teat liner is connected to a milk tube.

Embodiments are known in which the milk tube is connected to a milk transport line directly, that is to say without a milk collection piece being interposed.

Milking appliances comprising milking cups and a milk collection piece are known. WO 01/84913 discloses a milking appliance which has a milk collection piece. The milk collection piece has nipples which are connected to milk tubes. The milk tubes are connected at their other ends to milking cups. In the embodiment of a milking appliance known from WO 01/84913 A1, the milk tubes are designed as corrugated tubes. Further embodiments of milking appliances are known, for example, from the publications DE-A1-102 12 161, WO-A1-00/76299 and WO-A1-00/76300.

The milking appliances described in these publications have collection pieces having nipples to which the milk tubes are connected.

DE-A1-102 07 955 discloses yet another embodiment of a milking appliance. The milking appliance comprises a milk collection piece and milk tubes. One end of each milk tube is connected to the milk collection piece and the other end is connected to a milking cup. The milk collection piece has orifices. One end region of a milk tube is introduced into each orifice, so as to make a fluid-tight connection between the milk tube and the milk collection piece.

The milk tubes are connected to the milk collection piece such that a defined bend is obtained. The bend is intended to ensure that the milk tube is essentially sealed off when the milking cups are not attached to the teats. For this purpose, according to DE-A1-102 07 955, a bend element is provided, having a bending edge which is spaced apart from the connecting region of the milk tube and which defines a bending region in the milk tube.

U.S. Pat. No. A1 5,080,041 discloses a bent milk tube which is intended to reduce the stress upon the milk tube at the nipple of the milk collection piece.

It is known that the physiognomy of the udder, in particular of the teats, may differ greatly from one type of animal to another, from breed to breed and from animal to animal. It is also known that, for example, the spacings between the front teats are different from the spacings between the rear teats. This is taken into account by correspondingly adapting the spacings of the nipples on the milk collection piece. Furthermore, it is known that the milking cups may have different configurations or weights so as to be adapted more effectively to the animals.

Proceeding from this, the object on which the present invention is based is to specify a milk tube which has improved properties.

SUMMARY OF THE INVENTION

The milk tube according to the invention has at at least one end an essentially spherically designed clamping body. The center of the clamping body is offset with respect to the longitudinal axis of the milk tube.

Additionally or alternatively, the clamping body may be designed such that it has a duct with an issue, the longitudinal axis of the milk tube penetrating a plane, in which the cross-sectional area of the issue lies, at an angle different from 90°. This configuration according to the invention of the milk tube takes account of the fact that, for example, only limited space is available in the connecting region of the milk tube on the milk collection piece. The milk tube according to the invention also has the advantage that it becomes possible to set an angle such that an improved adaptation of the position of the milk tube is achieved. Furthermore, a fluid-tight connection of the milk tube to a collection piece or to a milking cup is achieved.

What is also achieved by the configuration according to the invention of the milk tube is that an essentially continuous constant pressure of the clamping body against a sealing surface is ensured. Especially when the clamping body is produced from an elastomeric material, a fluid-tight connection is still ensured. In particular, what is achieved by the shaping is that the clamping body does not become leaky at the sealing surface due to elastic deformation.

In order to make it possible to have an angle of the longitudinal axis of the milk tube with respect to a milk collection piece of preferably 30° to 60°, it is necessary to provide a spherical clamping body which has a relatively large diameter. Owing to the configuration according to the invention of the milk tube, in particular of the clamping body, the diameter of the clamping body can be reduced, with the result that the conditions of space on the milk collection piece are also taken into account.

Alternatively or additionally, the center of the clamping body may be displaced with respect to the longitudinal axis, so that a larger sealing surface is achieved. In addition to or instead of the displacement of the center of the clamping body, it is proposed that the clamping body have a duct with an issue, the longitudinal axis of the milk tube penetrating a plane, in which the cross-sectional area of the issue lies, at an angle different from 90°. This affords a suitable run-out, with the result that the size of the clamping body can also be reduced.

According to an advantageous development of the milk tube, it is also proposed that the clamping body be formed from at least two essentially spherically designed parts of different size. The two parts preferably have a parting plane which is inclined at an angle of 35° to 40° with respect to the milk tube axis. A refinement is in this case particularly advantageous in which the parts have in each case an axis lying on a straight line, this straight line lying in a plane of symmetry of the milk tube.

Owing to these preferred configurations of the milk tube, simplified mounting is achieved. Moreover, the dimensions of the corresponding clamping unit are reduced and its production is simplified. Since the at least two parts of the clamping body are of different size, a continuous margin is preferably obtained, which can be supported on the clamping unit and thus leads to an improved pressing action. Moreover, by means of this margin, the clamping unit is sealed off against contamination. This is important because the milk tube is used for milking an animal, and milk is a food which is subject to special hygiene regulations.

According to yet a further advantageous refinement of the milk tube according to the invention, it is proposed that at least one part of the clamping body be designed with an essentially elliptic cross section. This affords a steeper bearing surface, as compared with a circular cross-sectional shape, for the corresponding clamping unit.

In order to achieve a sufficient milk flow through the milk tube, the milk tube has an inside diameter lying between 7 and 14 mm. Since the milk tube is exposed to a vacuum, it is necessary for the milk tube, which is formed from an elastic material, to have a correspondingly high vacuum stability. A refinement of a milk tube is in this case preferred in which the ratio of the inside diameter of the milk tube to the outside diameter of the milk tube is between 0.35 and 0.65. With such geometric ratios, it is proposed that the ratio between the diameter of the clamping body and the outside diameter of the milk tube is between 1.2 and 3, in particular about 1.4.

According to yet a further advantageous refinement of the milk tube, it is proposed that the clamping body have a region with an essentially part-cylindrical surface area. A milk tube having even further improved properties is thereby provided.

In the milk tube according to the invention, the surfaces serving as sealing surfaces in the mounted state of the milk tube are formed with a correspondingly designed clamping body as parts of the spherical surface. These surface segments thus also make it possible to have an improved adaptation or orientation of the milk tube in relation to a milk collection piece.

The part-cylindrical design of the surface area also has the advantage that the milk tube can be produced more simply in conjunction with a teat liner. In particular, the removal of the milk tube together with a teat liner from the mold is simplified.

A refinement of the milk tube is preferred in which the center of the clamping body is offset with respect to the longitudinal axis of the milk tube. If the clamping body is an essentially spherically designed clamping body, the center of the clamping body is offset with respect to the longitudinal axis of the milk tube. An improved overlap of the clamping body in the mounted state is thereby achieved, since this offset leads to an improved introduction of force and also to greater variability in the choice of position. If the clamping body is secured by means of a clamping jaw designed essentially in the form of a ball socket, the offset of the ball center leads to a markedly better overlap of the clamping body from above, with the ball diameter being the same. The result of this, in particular, is that a greater latitude of movement is achieved in the region of the sealing surfaces. Thus, a central introduction of force in the direction of the axis of symmetry of a clamping jaw, serving as a second sealing surface, on the milk collection piece is ensured in many positions.

If it is required that the clamping body be surrounded essentially completely, in order to detain the milk tube securely and reliably in a specific position, it will be necessary for the essentially spherically designed clamping body to be surrounded completely or virtually completely. This leads, however, to a configuration of a milk collection piece having corresponding clamping jaws and being correspondingly large and clumsy. According to a further advantageous refinement of the milk tube according to the invention, therefore, it is proposed that the surface area be of essentially elliptic design.

What is achieved simply by the essentially cylindrically designed segment is that the size of the clamping body can be reduced to a specific extent. What is achieved with an elliptic configuration of the region is that the clamping body becomes narrower laterally, this being better for the dimension of the clamping unit. At the same time, since the essentially upwardly directed radius of the ellipse is larger, the supporting margin of the clamping body is increased in the region of the greatest load. This arises, for example, when the milk tube is connected to a milking cup, and the latter hangs down. The supporting margin lies in the region of engagement of the clamping jaw of the clamping unit, said region of engagement being greater than in the case of a simple cylindrical segment. The risk of the clamping body slipping out of a clamping unit under load is thus also minimized.

According to a further set object, the object on which the present invention is based is to specify a milking unit comprising a milk collection piece and at least two milk tubes connected to the milk collection piece, which milking unit makes it possible to have an even further improved adaptation to animals.

This object is achieved, according to the invention, by means of a milking unit comprising a milk collection piece and at least two milk tubes connected to the milk collection piece.

The milking unit according to the invention has a milk collection piece and at least two milk tubes connected to the milk collection piece. The milking unit according to the invention is distinguished in that the at least one releasable clamping connection is provided for securing at least one milk tube in relation to the milk collection piece, the clamping connection comprising at least two clamping jaws, between which a clamping body formed at the end region of the milk tube can be positioned.

Owing to this configuration according to the invention of the milking unit, forces and moments introduced by the milk tube into a milking cup connected to the milk tube are reduced. This is achieved in that adaptation to the animals to be milked can be achieved by means of the adjustable, in particular articulated connection, so that the angle at which the milk tube is connected to the collection piece can be varied positively. By means of the connection between the milk collection piece and the at least one milk tube, orientation is also achieved. The clamping connection is designed to be detainable. This affords the possibility of carrying out, preferably on the spot, that is to say during the milking of cattle, an adaptation of the milking unit to the animals to be milked. This is advantageous particularly when the herd is essentially homogeneous.

In a cattle milking business, there may even be several groups of milking stations which have the milking units according to the invention. Within a group of milking stations, the milking units may be configured such that these have identical presettings in terms of the angle of the milking cups with respect to the milk collection piece. The milking units within at least one other group may have milking units, the angle setting of which differs from the angle setting of at least one other group. By the animals being presorted, improved adaptation can be achieved, so that animals, the teats of which are shaped essentially in the same way or identically on the udder, are assigned to one group, and animals, the teats of which are configured differently in terms of the shape and/or arrangement with respect to the udder, are assigned to at least one other group. By means of this measure, the milking operation in the cattle milking business is simplified, in particular the attachment of the milking cups to the animal's teats.

Owing to the configuration according to the invention of the milking unit, the forces occurring during milking and acting on the teat are reduced, since a directed orientation of the milking cups can be achieved by means of the articulated connection which is detainable. In particular, what is achieved by the directed orientation of the milking cups connected to the milk tube is that these are oriented as far as possible in the direction of the teat axis.

For an even further improvement in the orientation of the milk tube in relation to the collection piece, it is proposed that the clamping connection be designed such that the end region of the milk tube has at least two degrees of freedom when the clamping connection is released.

According to yet a further advantageous refinement of the milking unit according to the invention, it is proposed that the clamping connection have a spherical clamping body and clamping jaws, the spherical clamping body being connected to the milk tube. The clamping jaws serve for detention, so that, after a specific angle has been set, the milk tube is secured in this position on the milk collection piece. In the secured state, the joint is immovable. The clamping force has to be reduced or canceled in order to vary the set angle. The clamping jaw does not necessarily have to be of two-part design. It is sufficient if the clamping jaw is of one-part design. The clamping jaw may be formed on the milk collection piece. The clamping jaw may, for example, be produced in one piece with a cover of a milk collection piece. In the case of a two-part clamping jaw, preferably one part of the clamping jaw is formed on the milk collection piece, while the other part of the clamping jaw forms part of a clamping unit by means of which the clamping body is secured to the milk collection piece.

The detainable configuration of the connection may be achieved both positively and non-positively. For setting an angle, if appropriate, a minimum force must be overcome, for example when there is a correspondingly configured positive connection between the spherical clamping body and the at least one clamping jaw, said positive connection being achieved, for example, by means of latchings. This configuration is not only advantageous in a clamping connection of a spherical clamping body. It is also advantageous in differently formed clamping connections.

A refinement is particularly preferable in which the spherical clamping body is an integral constituent of the milk tube.

According to yet a further advantageous refinement of the milking unit according to the invention, it is proposed that the spherical clamping body be formed from a material differing from the material of the milk tube. In particular, the spherical clamping body and the milk tube may be produced according to the multi-component injection molding method, in particular according to the two-component injection molding method.

The preferably spherical clamping body preferably has a larger diameter than the outside diameter of the milk tube. In particular, it is proposed that the clamping body have a diameter which amounts to between 1.2 and 3 times the outside diameter of the milk tube, in particular of the outside diameter of the milk tube in the region of transition to the clamping body. A diameter of the clamping body which corresponds approximately to 1.4 times the diameter of the milk tube is particularly preferred in this case. The preferably spherical clamping body is preferably designed such that it has an orifice which is directed towards the inner space of the milk collection piece and by means of which the outlet of the milk tube is connected to the inner space of the milk collection piece. The clamping body is pressed by at least one part of the clamping jaw or of a clamping unit into the other clamping jaw of the milk collection piece, so that a leaktight transition between the milk tube and the collection piece is obtained. Particularly by virtue of the rotational symmetry of the ball with respect to horizontal orientation, a continuous adjustability of the milk tube is possible.

It is not necessary for the center of the spherical clamping body to lie on a longitudinal axis of the milk tube. A configuration is preferred in which an eccentric arrangement is formed.

A design of the clamping connection is particularly preferred in which the ball center is displaced with respect to the connection on the milk collection piece from the longitudinal axis of the milk tube, in particular is displaced upwardly, that is to say away from the milk collection piece.

According to yet a further advantageous embodiment of the milking unit according to the invention, it is proposed that the spherical clamping body and/or at least one clamping jaw have macrostructures which engage into corresponding recesses, with the result that angle setting in discrete steps is possible. Furthermore, stops may be provided, with the result that an adjustability of the angle is restricted to a defined range. Different angle settings or orientations of individual milk tubes or of all the milk tubes in relation to the milk collection piece can also be achieved in that at least one clamping jaw is formed as an exchangeable clamping jaw. Furthermore, there is the possibility of varying the angle setting by interchanging the clamping jaws. If, for example, a milk collection piece with four connections for milk tubes is considered, a changed angle setting can be achieved by interchanging the clamping jaws, for example in the clockwise direction of the connection points for the milk tubes.

According to yet a further advantageous refinement of the milking unit, it is proposed that at least one milk tube be designed such that a longitudinal axis of the milk tube intersects an axis of articulation of the joint at an angle different from 90°.

A refinement of the milk tube is in this case particularly preferred in which the latter has a clamping body by means of which the milk tube can be secured to the milk collection piece.

The clamping body preferably has an essentially polygonal, in particular circular cross section.

According to yet a further advantageous refinement of the milking unit, it is proposed that the milk tube have at least one segment of curved design. A refinement is in this case particularly preferred in which the at least one segment is formed adjacently to the milk collection piece.

To simplify the adjustability of at least two clamping connections, it is proposed that these have one common clamping unit.

According to yet a further advantageous refinement of the milking unit, it is proposed that this have at least two milk tubes which are connected to the milk collection piece in an articulated manner. The longitudinal axes of the milk tubes in the region of the connection between the milk tube and the collection piece describe a theoretical cone with an aperture angle. The cone does not have to be formed in the strict mathematical sense. The longitudinal axes of two adjacent milk tubes form an angle which is smaller than an aperture angle of the cone. The articulated connection is preferably detainable.

According to yet a further inventive idea, a milking cup comprising a milking cup sleeve, in which a teat liner is arranged, and a milk tube connected to the teat liner is proposed, the connection between the teat liner and the milk tube being formed by means of a detainable joint.

According to yet a further inventive idea, a milking appliance comprising a milk collection piece, at least two milking cups which have in each case a milking cup sleeve and a teat liner arranged in the milking cup sleeve, and milk tubes which connect the milking cups to the milk collection piece is proposed, at least one first articulated connection between a milk tube and the milk collection piece and a second articulated connection between a milk tube and the milk collection piece being provided, at least one articulated connection being detainable.

By virtue of the present invention, the shear forces acting on the teat base are at least reduced, if not even avoided completely. The present invention affords the possibility of carrying out an individual setting for each cow. If the farmer does not wish to set the milking appliance for each individual cow, he can alternatively carry out at least a setting individual to an animal group. Furthermore, by virtue of the invention, the exchangeability of the individual components of a milking appliance is achieved. Particularly because at least one clamping jaw is exchangeable, a considerable cost reduction in the production of the milking unit is achieved. Individual clamping jaws can be replaced, for example, by being exchanged, the newly used clamping jaws making it possible to have other angle settings. Furthermore, there is the possibility, as already stated above, that an angle setting can be varied by the jaws being interchanged.

Further details and advantages of the invention are explained by means of the exemplary embodiments illustrated in the drawing, without the subject of the invention being restricted to these concrete exemplary embodiments.

DETAILED DESCRIPTION OF THE PREFERRED EMBODIMENTS

Figure 1:
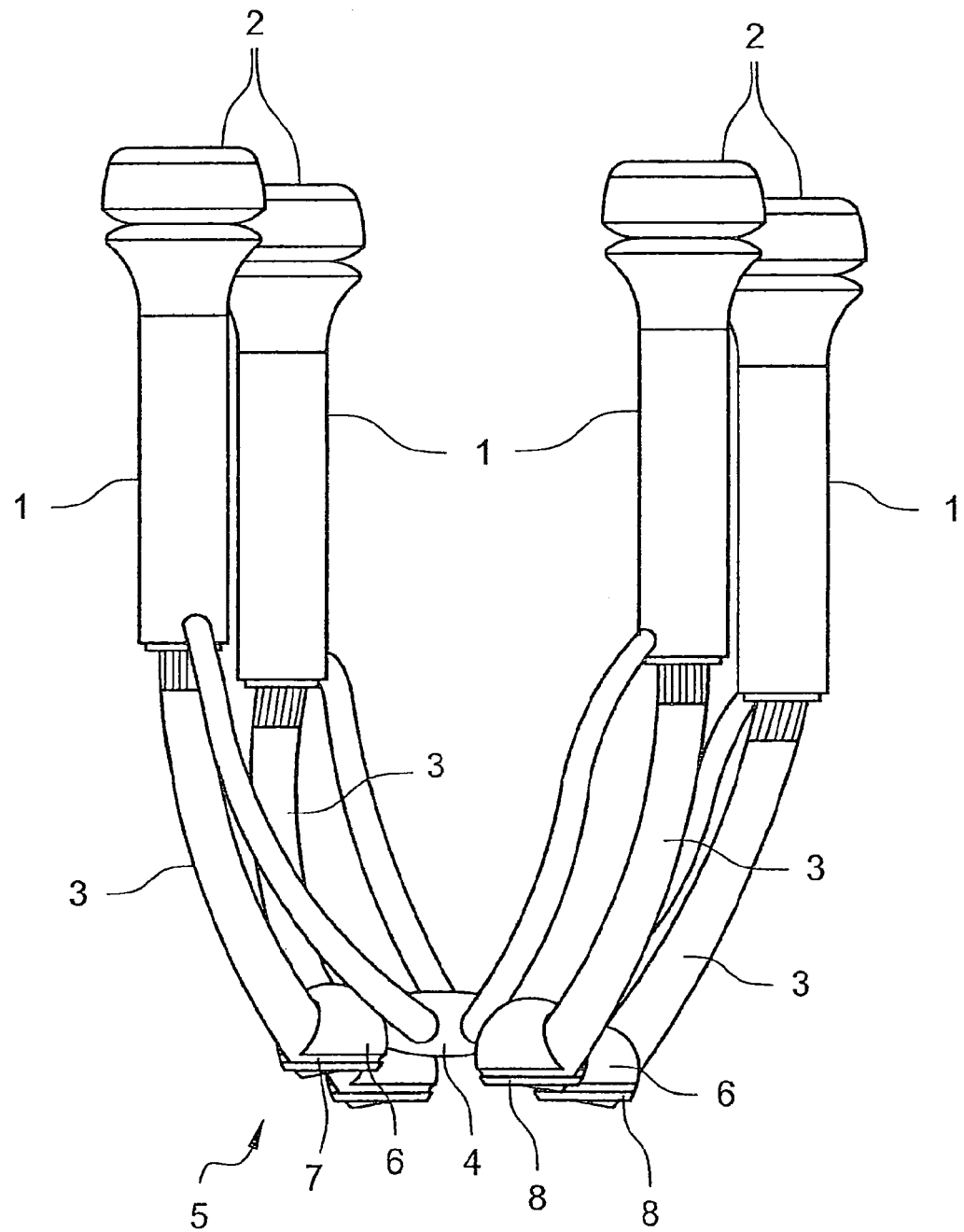
FIG. 1 shows a perspective view of a milking appliance.

FIG. 1 shows an exemplary embodiment of a milking appliance for the milking of cows. The milking appliance comprises milking cups 1 which have teat liners 2. Milk tubes 3 are connected to the milking cups. The opposite ends of the milk tubes 3 are connected to a milk collection piece, not illustrated, so as to be adjustable in relation to the milk collection piece. In the exemplary embodiment illustrated in FIG. 1, the connection of the milk tubes 3 to the milk collection piece is a clamping connection.

There is the possibility that not all the milk tubes are connected to the milk collection piece by means of clamping connections. There is the possibility that different clamping connections are provided for the connection between the milk tubes and the milk collection piece. Furthermore, there is the possibility that only a predetermined number of the milk tubes are connected to the milk collection piece in an articulated manner. Thus, for example, two milk tubes may be connected to the milk collection piece in an articulated manner, while the other two milk tubes are connected rigidly to the milk collection piece.

Moreover, the clamping connections between the milk tubes and the milk collection piece may be designed such that the pivotability of individual or a plurality of milk tubes in relation to one another is configured differently.

In the exemplary embodiment illustrated in FIG. 1, the milk tubes 3 are designed in each case with a clamping connection. The clamping connection 5 has a first clamping jaw 6 and a second clamping jaw 8. The second clamping jaw 8 is formed on the milk collection piece, not illustrated. A correspondingly shaped spherical clamping body 7 engages into the clamping jaw 8. A clamping unit 4 is provided for detaining the joint. The first clamping jaws 6 are connected to the clamping unit 4. There is the possibility that a separate clamping unit 4 is provided for each clamping connection between a milk tube 3 and the milk collection piece. There is also the possibility, however, that some or all of the clamping connections are detained by means of one common clamping unit.

Figure 2:
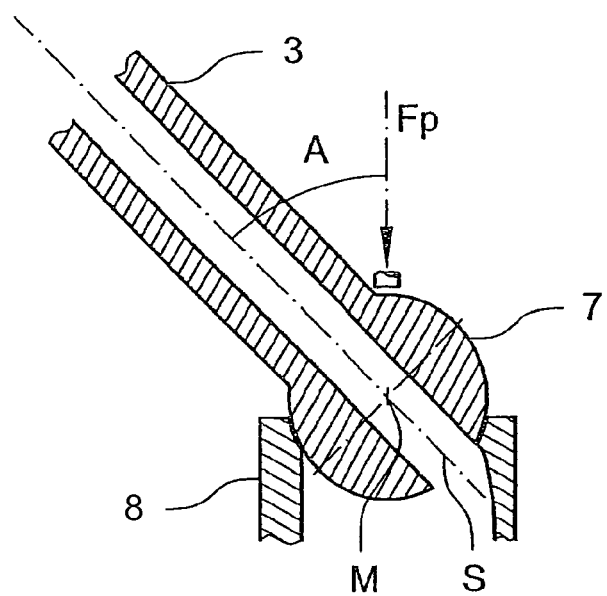
FIG. 2 shows in section an exemplary embodiment of a clamping connection.

A clamping connection between a milk tube 3 and a milk collection piece is illustrated diagrammatically and in section in FIG. 2. The connection has a clamping jaw 8 in which the spherical clamping body 7 is arranged. A spherical clamping body in the meaning of the invention may also be formed by a ball or a spherical element which is connected fluidically to the milk tube. The spherical clamping body may be a separate component which is connected positively and/or non-positively to the milk tube. However, a configuration is preferred in which the spherical clamping body is an integral constituent of the milk tube 3, as is clear from FIG. 2 or FIG. 3.

By means of the clamping connection, the angle A can be set in a vertical plane. In light of the fact that the clamping connection has three degrees of freedom, this affords the possibility of achieving an exact orientation of the milk tube and therefore also of the milking cup.

For detention and for fluid-tight connection between the milk tube 3 and the milk collection piece, not illustrated in FIG. 2, a force $F_p$ is exerted on the spherical clamping body 7.

It is clear from the illustration according to FIG. 2 that the diameter of the spherical clamping body 7 is larger than the outside diameter of the milk tube. The diameter of the spherical clamping body preferably corresponds approximately to 1.2 to 3 times the outside diameter of the milk tube. It became apparent that it is particularly advantageous if the diameter of the spherical clamping body corresponds preferably to about 1.4 times the outside diameter of the milk tube. If the clamping body consists of a thermoplastic, the selected diameter of the clamping body may even be smaller than the diameter of the milk tube.

The longitudinal axis of the milk tube 3 is designated by reference symbol S. Reference symbol M identifies the center of the spherical clamping body 7. In the embodiment illustrated in FIG. 2, the center M of the spherical clamping body 7 lies on the longitudinal axis S, so that the milk tube has, at least in the region of the clamping connection, an essentially rotationally symmetrical design.

Figure 3:
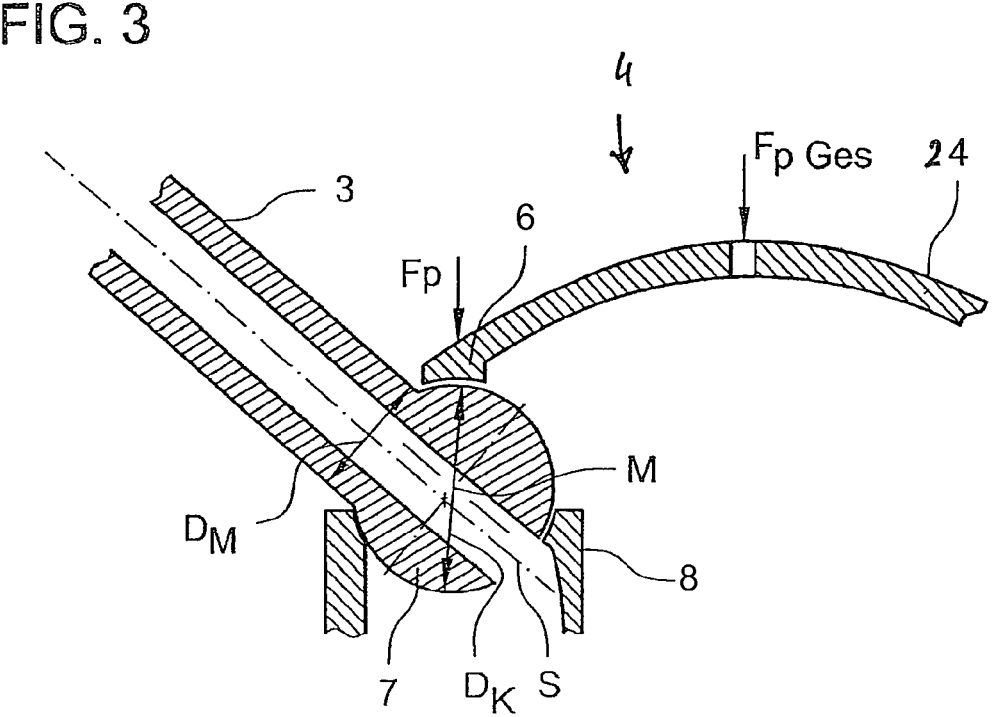
FIG. 3 shows in section the configuration of a clamping connection with a clamping unit.

FIG. 3 shows a further exemplary embodiment of a clamping connection between a milk tube 3 and a milk collection piece, not illustrated. The milk collection piece has a second clamping jaw 8 into which a spherical clamping body 7 engages. The spherical clamping body 7 is connected to the milk tube 3. It is clear from the illustration according to FIG. 3 that the center M of the spherical clamping body does not lie on the longitudinal axis S of the milk tube 3. This is displaced upward, that is to say away from the milk collection piece, not illustrated. The configuration of the clamping jaw is preferably such that this has as large an orifice as possible and as defined a small sealing surface as possible is present.

The clamping jaw and the spherical clamping body are preferably designed fluidically such that the flow resistance is as low as possible. The clamping jaw may have corresponding guide surfaces by means of which the flowing milk experiences a preferential flow direction from the milk tube into the milk collection piece.

The spherical clamping body and/or the clamping jaw may be provided with microstructures and/or macrostructures, by means of which the spherical clamping body and the clamping jaw can be pivoted in discrete steps in relation to one another. The microstructures and/or macrostructures may be formed by corresponding projections and recesses.

It is clear from FIG. 3 that the clamping connection can be detained by means of a clamping unit. In the exemplary embodiment illustrated, the clamping unit 4 has a carrying body 24 provided with corresponding clamping jaws 6, although this is not necessary, but is still advantageous. In this case, via the clamping unit 4, a force is exerted on the spherical clamping body 7 and gives rise to a fluid-tight connection between the spherical clamping body 7 and the clamping jaw 8 on the milk collection piece. The clamping jaws 8 may be connected pivotably, preferably rotatably, to the carrying body 24, so that the clamping jaws can assume different positions, specifically independently of the position of the carrying body 24. Any manufacture-induced tolerances can thereby also be compensated.

Figure 4:
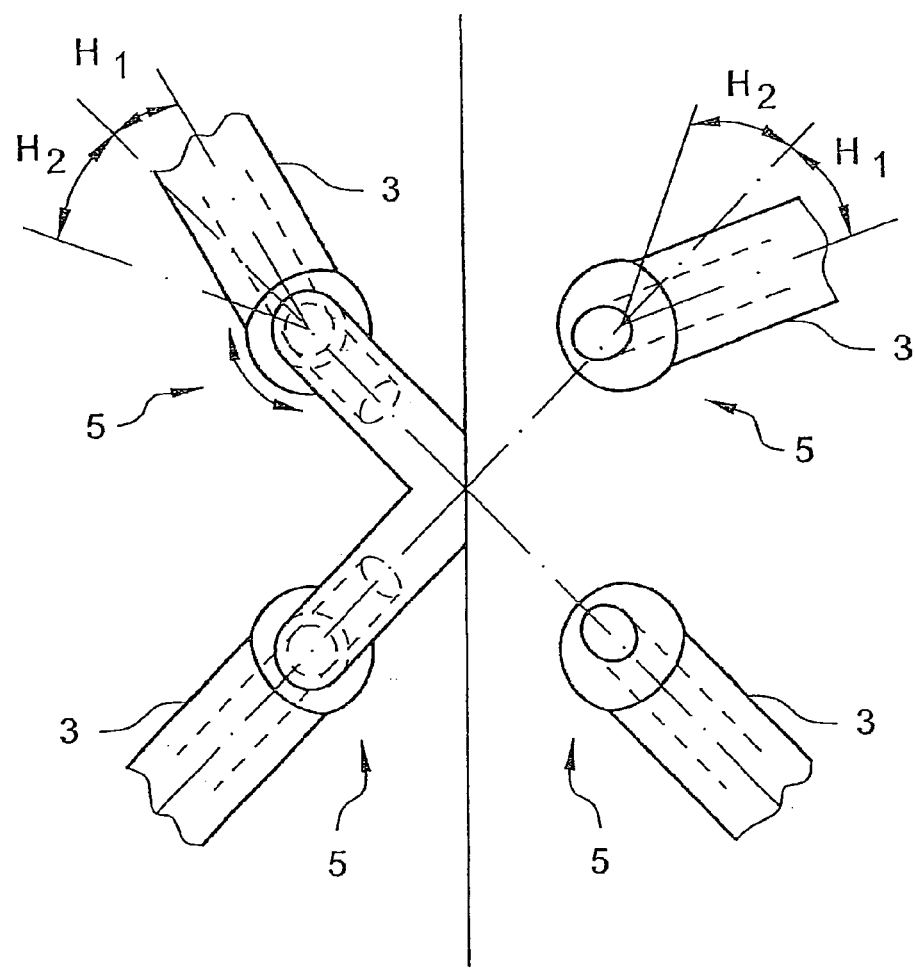
FIG. 4 shows diagrammatically the pivotability of milk tubes in one plane.

By the clamping unit 4 being released, individual or all connections can be freed, so that an adjustability of individual or all milk tubes with respect to one another and to the milk collection piece is achieved. FIG. 4 shows a top view of milk tubes 5 which are oriented differently from one another, so that an optimal setting for the animals to be milked is achieved. Reference symbols H1 and H2 designate angles about which the individual milk tubes can be deflected.

Figure 5:
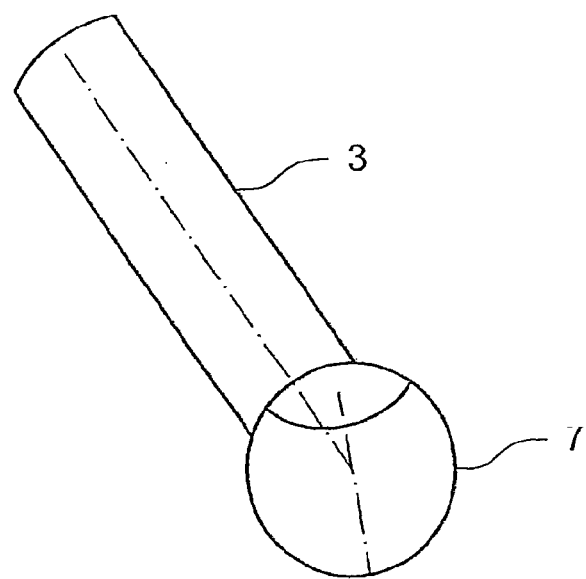
FIG. 5 shows in perspective a first exemplary embodiment of a milk tube with a spherical clamping body.
Figure 6:
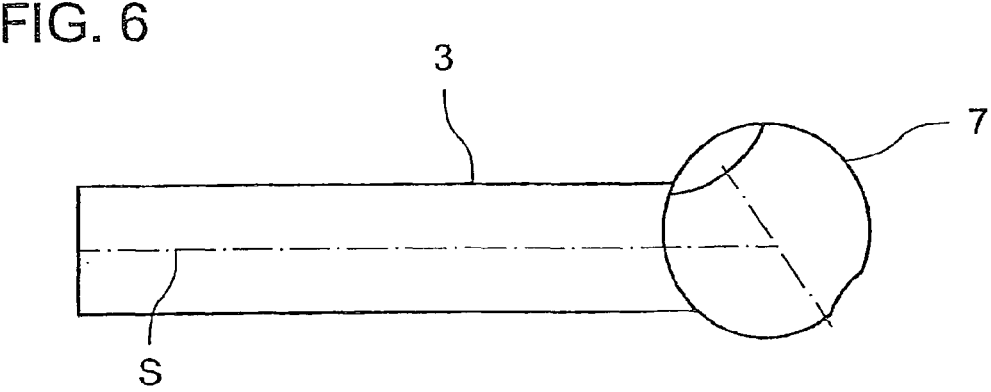
FIG. 6 shows the milk tube according to FIG. 5 in a front view.
Figure 7:
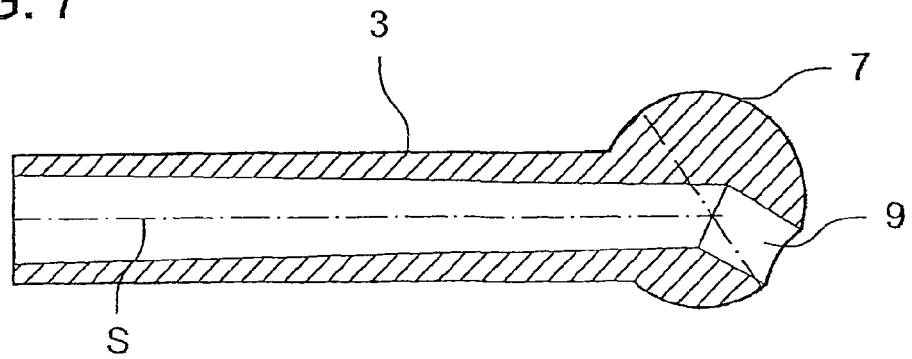
FIG. 7 shows the milk tube according to FIG. 6 in section.

FIGS. 5 to 7 show an embodiment of a milk tube 3. The milk tube 3 has at one end a spherical clamping body 7. The center of the spherical clamping body 7 does not lie on the longitudinal axis S of the milk tube, and therefore a greater overlap by a clamping unit which introduces the sealing force into the spherical clamping body 7 is achieved. Furthermore, it is clear from the illustration according to FIG. 7 that the outlet 9 in the spherical clamping body 7 is inclined with respect to the longitudinal axis S. What can be achieved thereby is that the diameter of the spherical clamping body can be reduced, while a sufficiently large overlap with the clamping jaw can be achieved.

Figure 8:
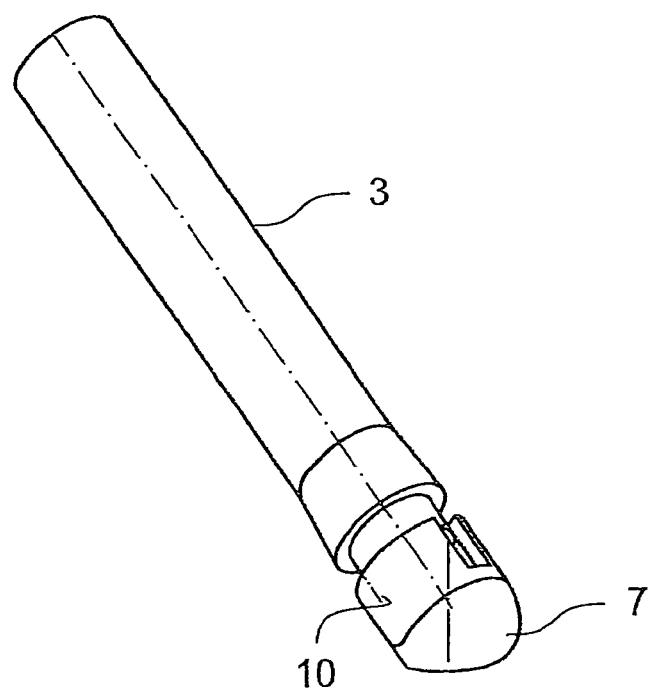
FIG. 8 shows a second exemplary embodiment of a milk tube in a perspective view.
Figure 9:
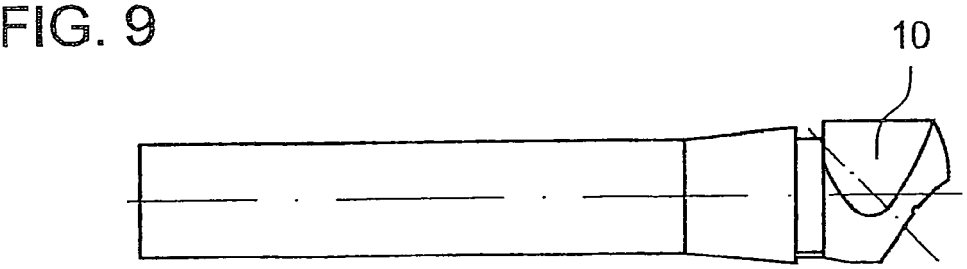
FIG. 9 shows the milk tube according to FIG. 8 in a front view.
Figure 10:
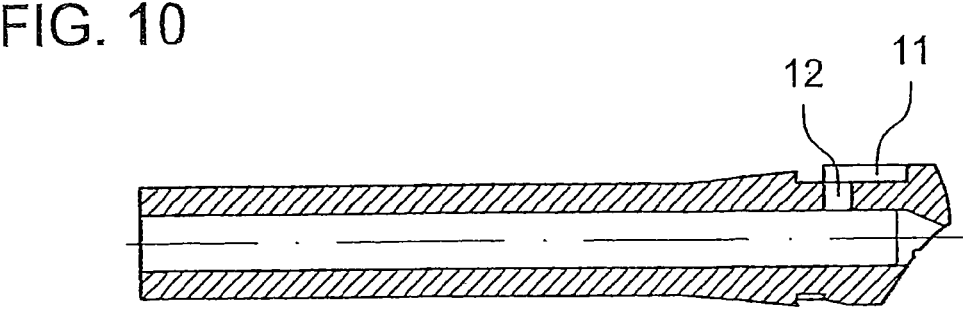
FIG. 10 shows the milk tube according to FIG. 9 in section.

FIGS. 8 to 10 illustrate yet a further exemplary embodiment of a milk tube. The milk tube 3 has a spherical clamping body 7. The spherical clamping body 7 has a region 10 which is of essentially cylindrical design. A groove 11 is provided within the region 10. The groove 11 ensures that at least the spherical clamping body 7 can be removed more easily from the mold. Furthermore, a recess 12 is provided, into which a correspondingly complementary part can be introduced, with the result that the milk tube can be secured in a defined position on the milk collection piece.

A corresponding projection which is formed on the clamping jaw may also engage into the groove 11. If the projection engages into the groove, the milk tube can assume a predetermined defined position. If the clamping jaw is pivotable, preferably rotatable, the clamping jaw, together with the milk tube, is positioned via the clamping body. This ensures that the outlet orifice is always in a permissible position.

Figure 11:
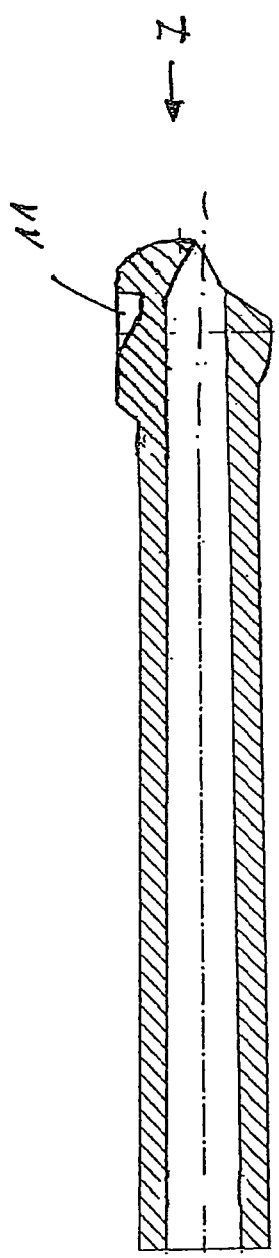
FIG. 11 shows a third exemplary embodiment of a milk tube in section.
Figure 12:
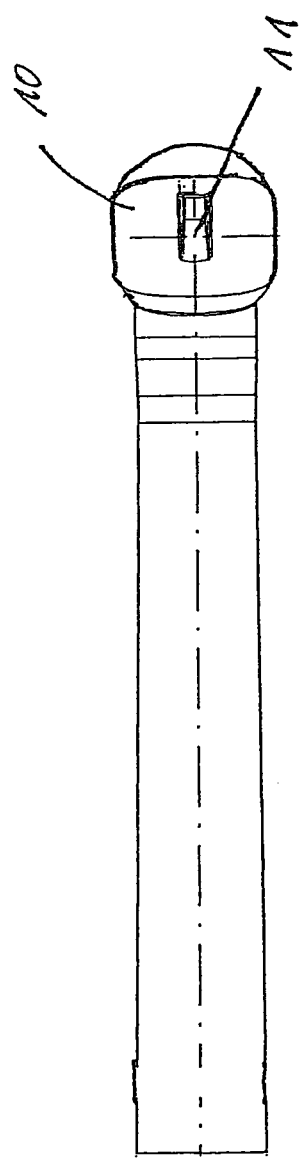
FIG. 12 shows the milk tube according to FIG. 11 with a clamping unit.

FIGS. 11 and 12 illustrate a further exemplary embodiment of a milk tube according to the invention. The milk tube 3 has an essentially spherical clamping body 7. The clamping body 7 has a region 10. The region forms a surface area 34 which is of essentially elliptic design. The center of the spherical clamping body 7 is spaced apart upwardly from the longitudinal axis of the milk tube in terms of the illustration in FIG. 11. This leads to a markedly better overlap of the ball from above, the ball diameter being the same. This is especially desirable and advantageous for as large a latitude of movement as possible in the region of the sealing surface. Thus, a central introduction of force in the direction of the axis of symmetry of the clamping jaw on the milk collection piece, said clamping jaw serving as a second sealing surface, is ensured in a large number of positions. The elliptic shape affords the advantage that the clamping body becomes narrower laterally, this being better for the dimensioning of the clamping unit.

At the same time, since the larger radius of the ellipse is directed upward, the supporting margin of the clamping body in the region of the highest load which occurs when a teat cup is connected to the milk tube and hangs down is larger in the region of engagement of the clamping jaw of the clamping unit than in the case of a simple cylindrical region 10. Thus, the risk of the clamping body slipping out from the clamping jaw under load is minimized. The milk tube may be produced in one piece with a teat liner.

Figure 13:
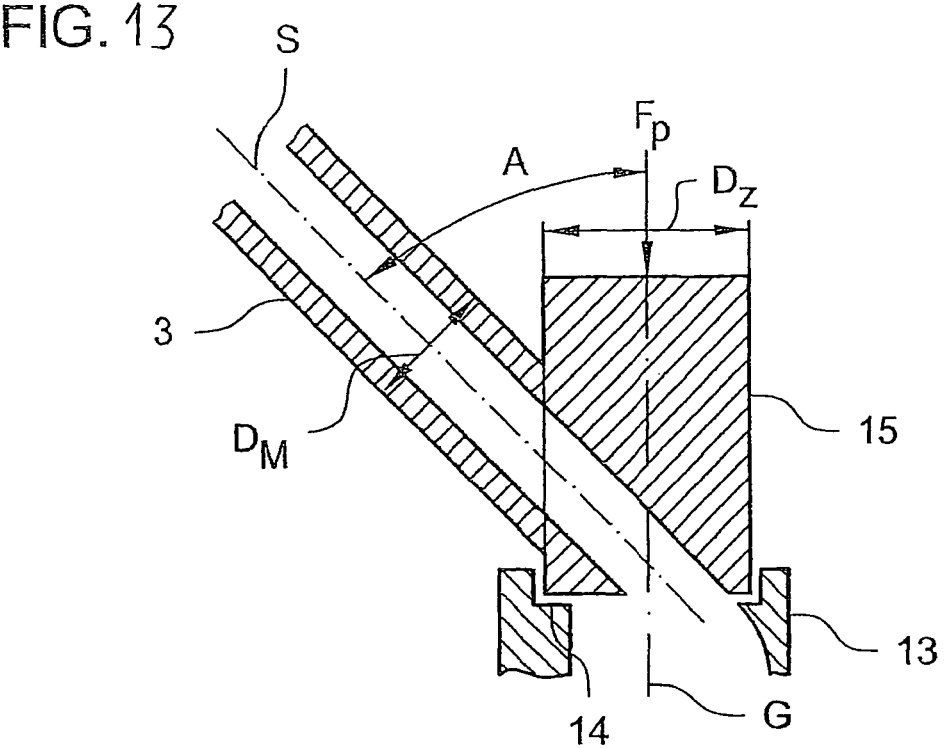
FIG. 13 shows a fourth exemplary embodiment of a milk tube in a front view.
Figure 14:
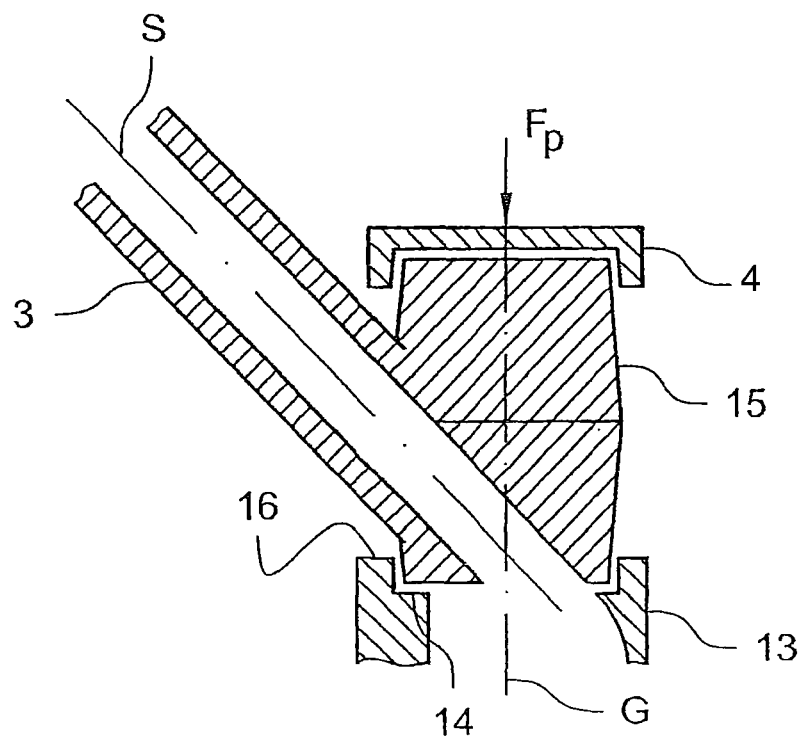
FIG. 14 shows the milk tube according to FIG. 13 in a perspective view.

FIGS. 13 and 14 illustrate a further exemplary embodiment of a clamping connection between a milk tube and a milk collection piece. The milk collection piece is provided with a connection 13 which has a sealing seat 14. The milk tube 3 has a clamping body 15 which is of essentially cylindrical design. The longitudinal axis of the clamping body 15 runs essentially coaxially with respect to the axis of articulation G. The sealing seat 14 has a geometry adapted to the clamping body 15. It is clear from the illustration according to FIG. 11 or 12 that the longitudinal axis S of the milk tube 3 intersects the axis of articulation G at an angle A. By the milk tube 3 being pivoted about the axis of articulation G, the position of the milking cup can be varied.

The clamping body 15 is preferably designed to be at least partly elastic. By a clamping force $F_p$ being applied to a clamping unit 8, on the one hand, the clamping body 15 is detained in a predetermined position and, on the other hand, a fluid-tight connection is made between the clamping body and the connection 13. The connection 13 preferably has a peripheral collar 16, against which part of the surface area of the clamping body 15 can come to bear when the latter is acted upon by the clamping force $F_p$, with the result that the fluid-tight connection between the clamping body 15 and the connection 13 can be improved even further. The clamping body 15 may be connected releasably to the milk tube. A configuration is preferred in which the clamping body and the milk tube are produced in one piece. In this case, the clamping body may be formed from a material other than that of the milk tube.

The cylindrical configuration of the clamping body 15 constitutes a preferred embodiment of the clamping body. This is not absolutely necessary. The clamping body may also have a polygonal cross section. If appropriate, the connection 13 has a shape adapted to the polygonal cross section, so that an adjustability of the milk tube or a pivotability of the clamping body 15 about the axis of articulation G can take place in predetermined angle steps. The angle steps may all be identical or different.

Figure 15:
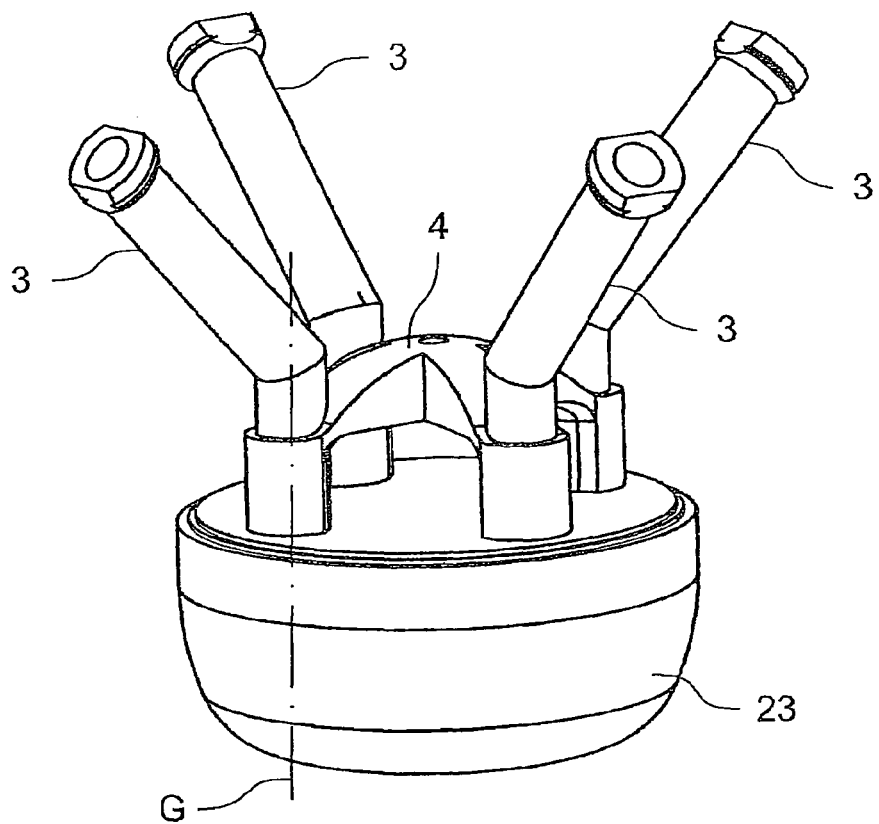
FIG. 15 shows in a perspective view a milk collection piece with milk tubes.
Figure 16:
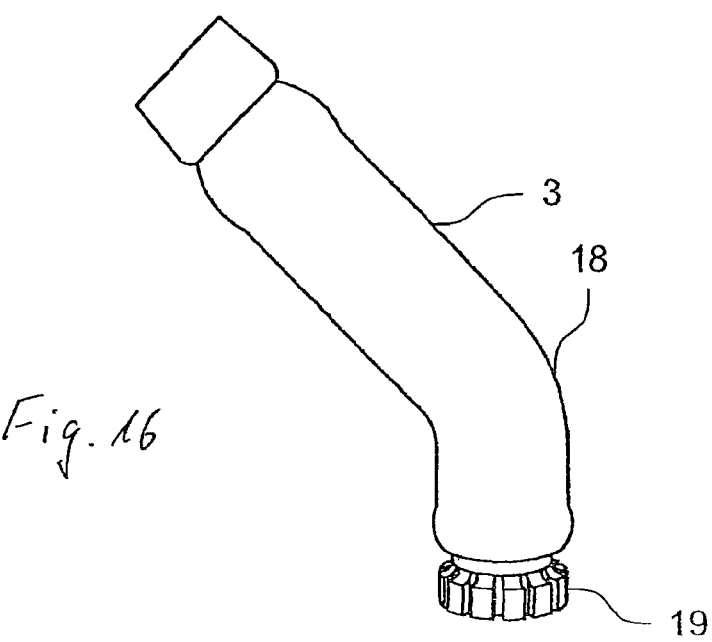
FIG. 16 shows an exemplary embodiment of the milk tube according to FIG. 15.

Yet a further embodiment of a milk tube 3 with a clamping body 15 is illustrated in FIGS. 15 and 16. The milk tube 3 has a clamping body 15 of essentially disk-shaped design. To limit the pivot angle about the axis of articulation G, a stop 17 is provided which is pivotable between two stops, not illustrated, formed on the milk collection piece. To secure the milk tube, a clamping unit, not illustrated, may be provided, which is of essentially annular design, so that this clamping unit exerts a clamping force on the clamping body 15. Within the annularly designed clamping unit, corresponding clearances may be provided, through which the stop 17 extends. An angle setting can thereby be carried out in discrete steps. The clearances in the clamping unit of essentially annular design may be produced by being stamped out.

Figure 19:
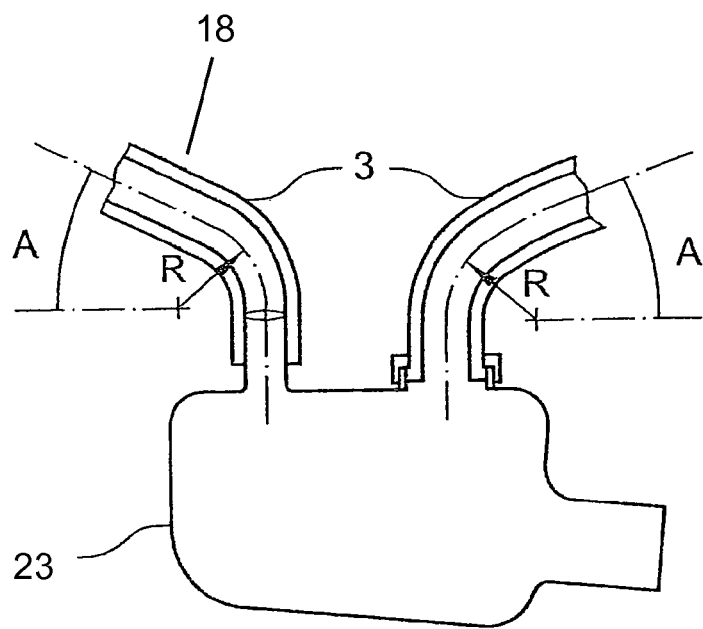
FIG. 19 shows the milk collection piece with milk tubes in a sectional view.

FIG. 19 shows an exemplary embodiment of a milk collection piece 23 together with milk tubes 3. The milk tubes 3 are secured to the milk collection piece 23 via one common clamping unit 4. The milk tubes 3 are pivotable about corresponding axes of articulation G.

Figure 21:
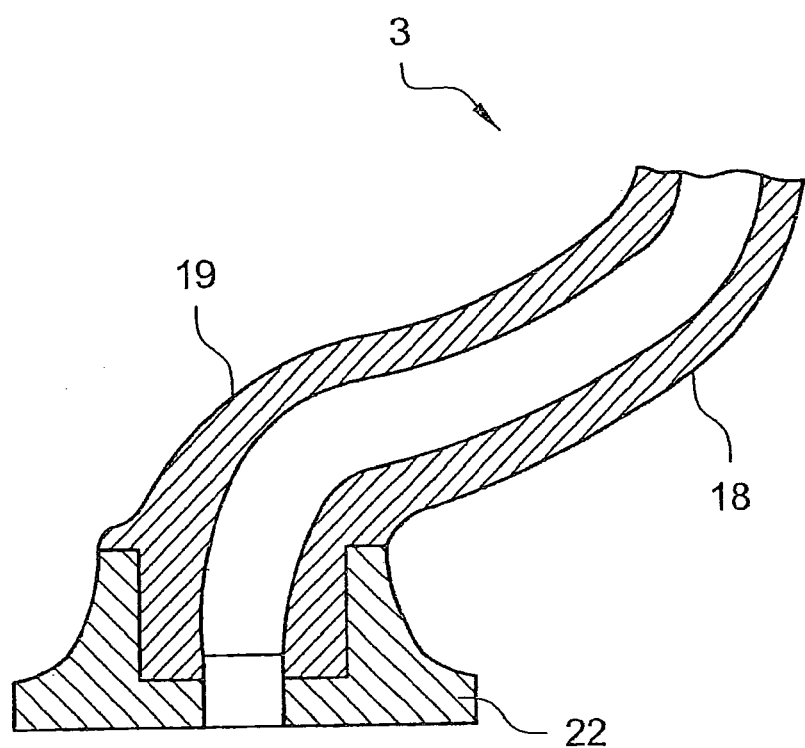
FIG. 21 shows a further exemplary embodiment of a milk tube in a sectional view.

It is clear particularly from FIG. 21 that the milk tube 3 has a curved segment 18. That end region of the milk tube 3 which is adjacent to the curved segment has a clamping body 19 which is brought to bear against the milk collection piece indirectly or directly. The clamping body 19 co-operates with the clamping unit 4, so that a fluid-tight connection is made between the milk tube 3 and the milk collection piece 23 when a sufficient clamping force is applied to the clamping body 19 via the clamping unit 4.

The clamping body 19 may have at least one radially outward-directed projection which projects into a corresponding clearance in the clamping unit, the extent of the clearance being greater than the width of the projection, as seen in the circumferential direction, so that a pivotability of the milk tube is limited within a specific angular range.

Figure 17:
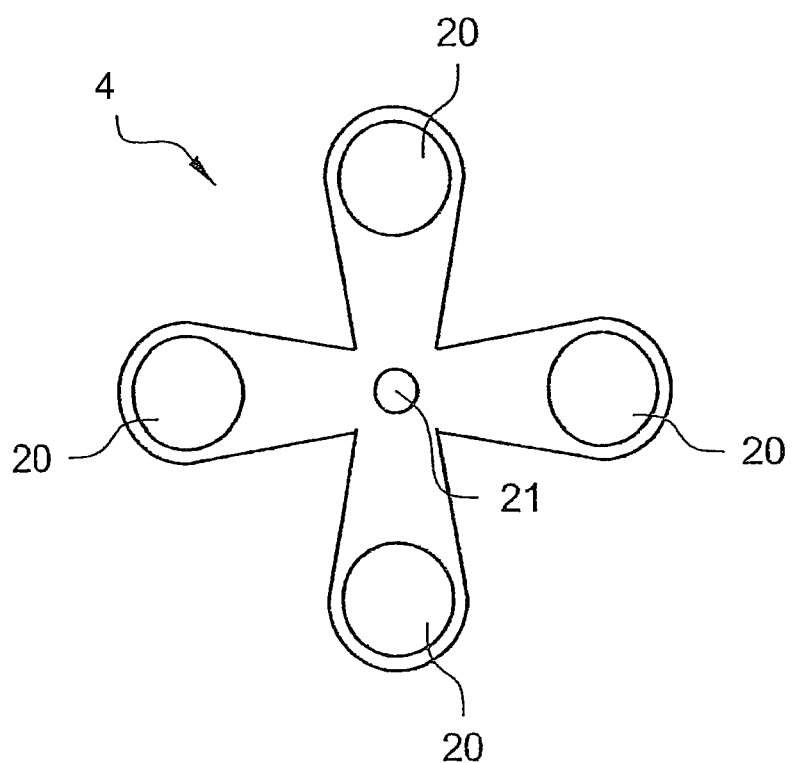
FIG. 17 shows a clamping unit in a top view.
Figure 18:
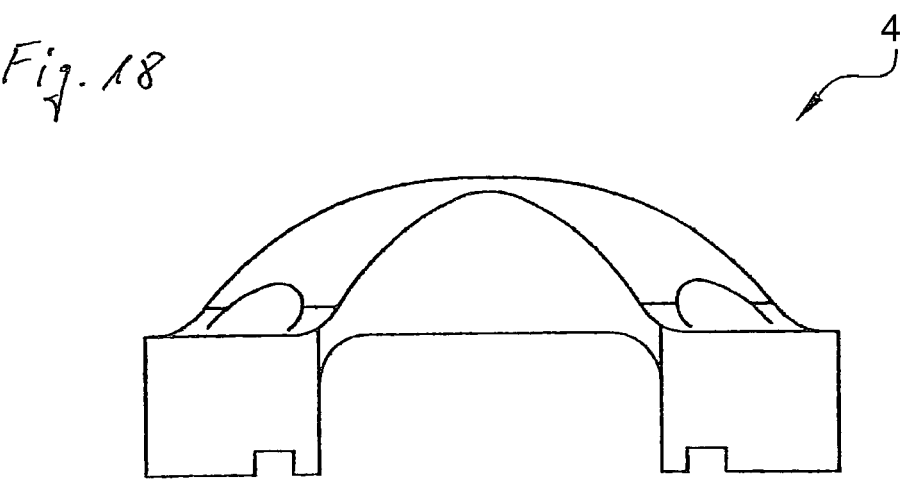
FIG. 18 shows the clamping unit according to FIG. 17 in a perspective view.

FIGS. 17 and 18 show an embodiment of a clamping unit 4. The clamping unit 4 has passages 20. A milk tube 3 extends through a passage 20. It is clear from the illustration according to FIG. 17 that, at the center of the clamping unit 4, a passage bore 21 is provided, by which a connecting means, not illustrated, can be connected to the milk collection piece.

Figure 20:
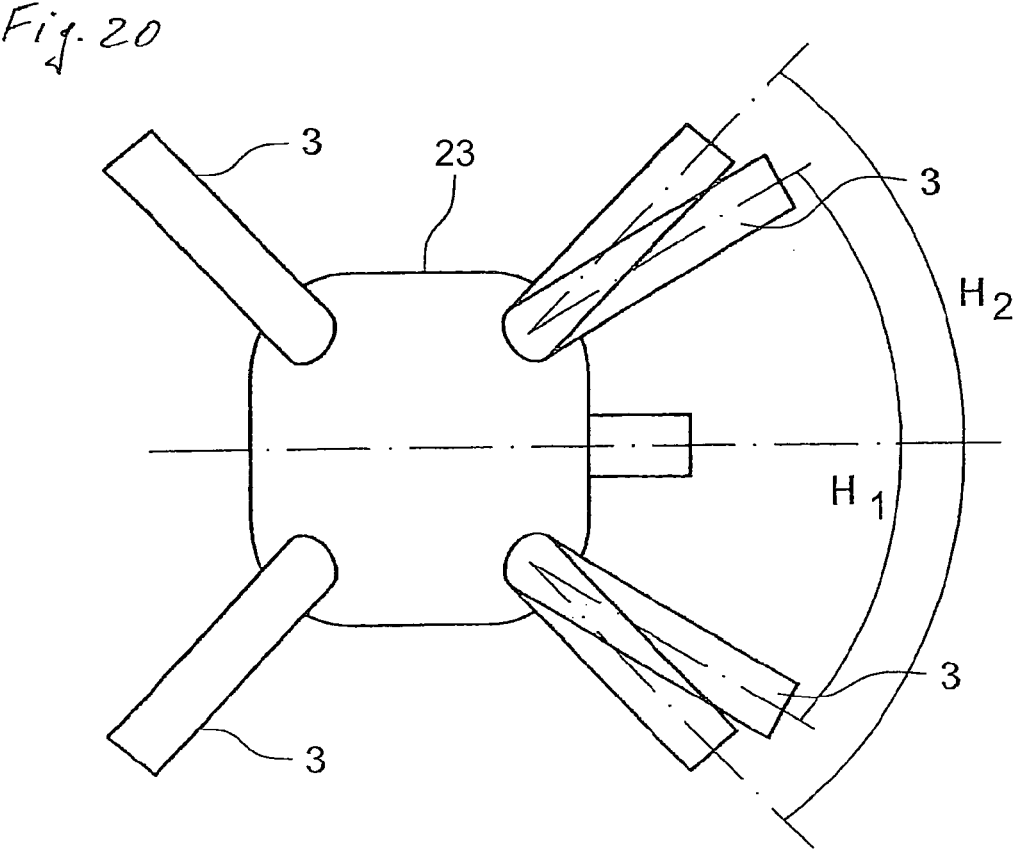
FIG. 20 shows the milk collection piece with milk tubes according to FIG. 19 diagrammatically in a top view.

The pivotability of the milk tubes 3 is illustrated in FIG. 19 or 20. The milk tubes may be correspondingly oriented individually. Owing to the configuration of the clamping unit, a plurality of milk tubes can be oriented correspondingly even in one operation.

The curved segment 18 of the milk tube 3 has a radius of curvature R. Different radii of curvature R may be provided. Thus, for example, a pair of milk tubes connecting milking cups for milking the front teats may have different radii of curvature from the milk tubes connecting milking cups for the rear teats.

For an even further improvement in adjustability, the milk tube 3 may also have a plurality of curved segments, as is clear from FIG. 21.

It is illustrated, further, in FIG. 21 that an end segment of the milk tube 3 is equipped with an adapter 22 which forms a clamping body.

By virtue of the invention, essentially no forces or moments are introduced into the teats or into the udder bottom by the milking cups. The milking behavior of the animals is thereby influenced positively.

Figure 22:
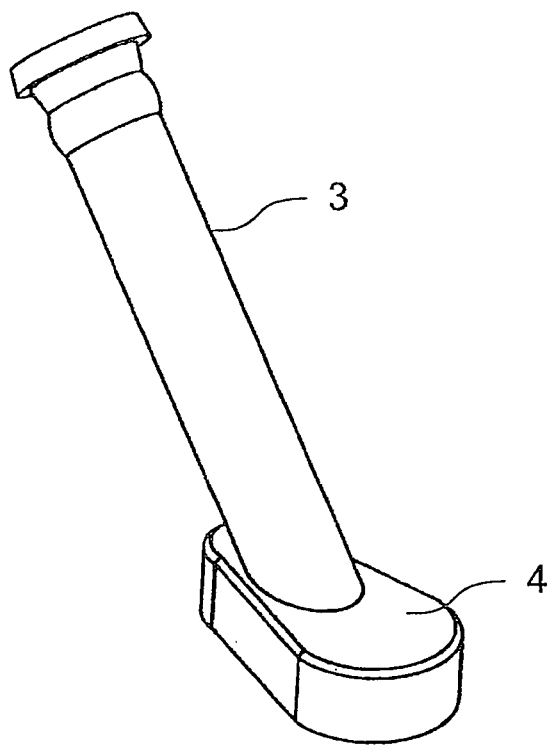
FIG. 22 shows the milk tube with a clamping unit in a perspective view.
Figure 23:
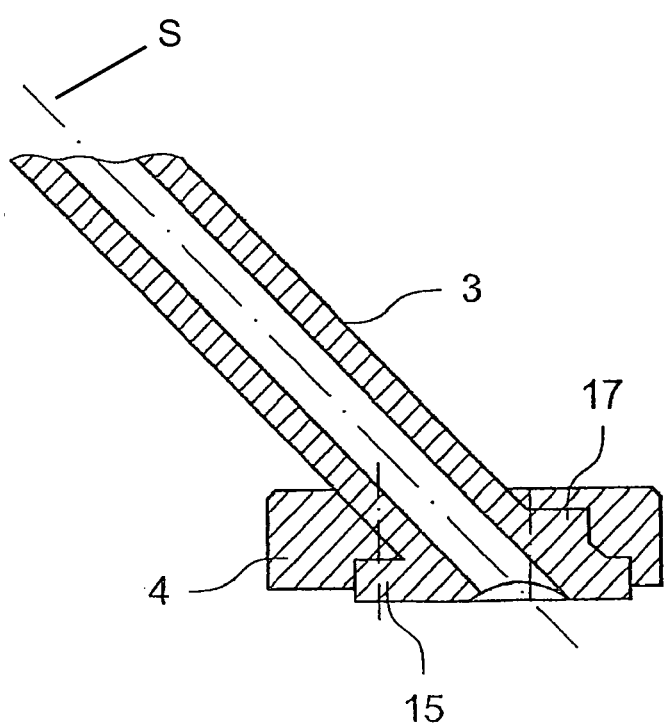
FIG. 23 shows the milk tube according to FIG. 22 in section.

Yet a further configuration of a clamping connection is illustrated in FIGS. 22 and 23. The milk tube 3 has an asymmetrically designed clamping body 15. The clamping jaw surrounds the clamping body 15.

At least one milk tube is formed from an elastic material. This may be, for example, silicone (LSR or HTV), liner or TPE. The milk tube may be produced in one piece, preferably in one part, with a teat liner.

Figure 24:
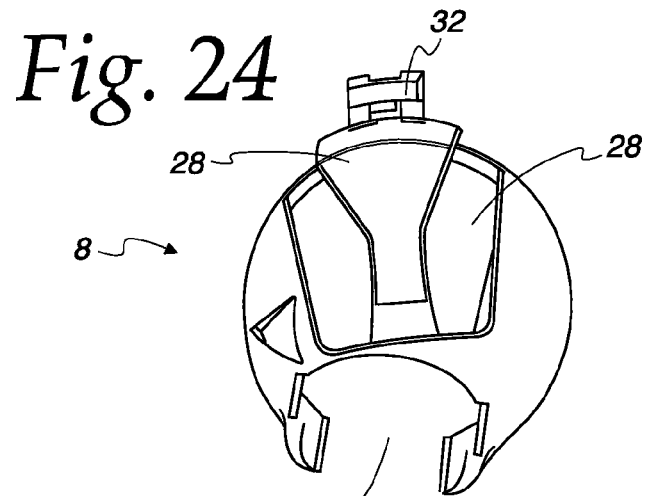
FIG. 24 shows a clamping jaw in a top view.
Figure 25:
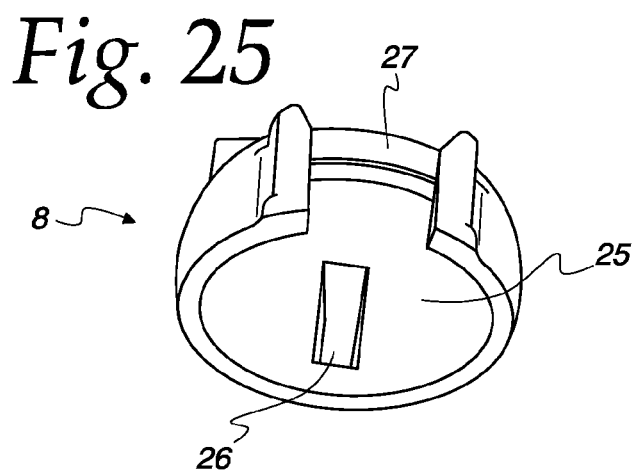
FIG. 25 shows the clamping jaw according to FIG. 24 in a perspective view from below.
Figure 26:
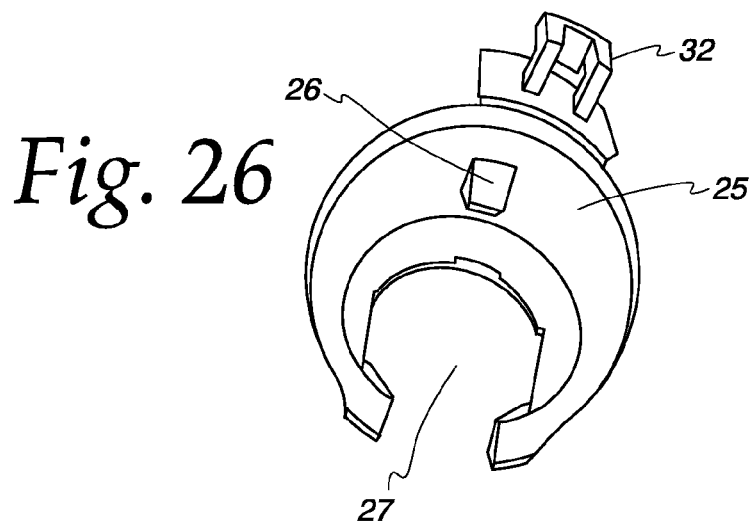
FIG. 26 shows the clamping jaw according to FIG. 24 in a perspective view from below.
Figure 27:
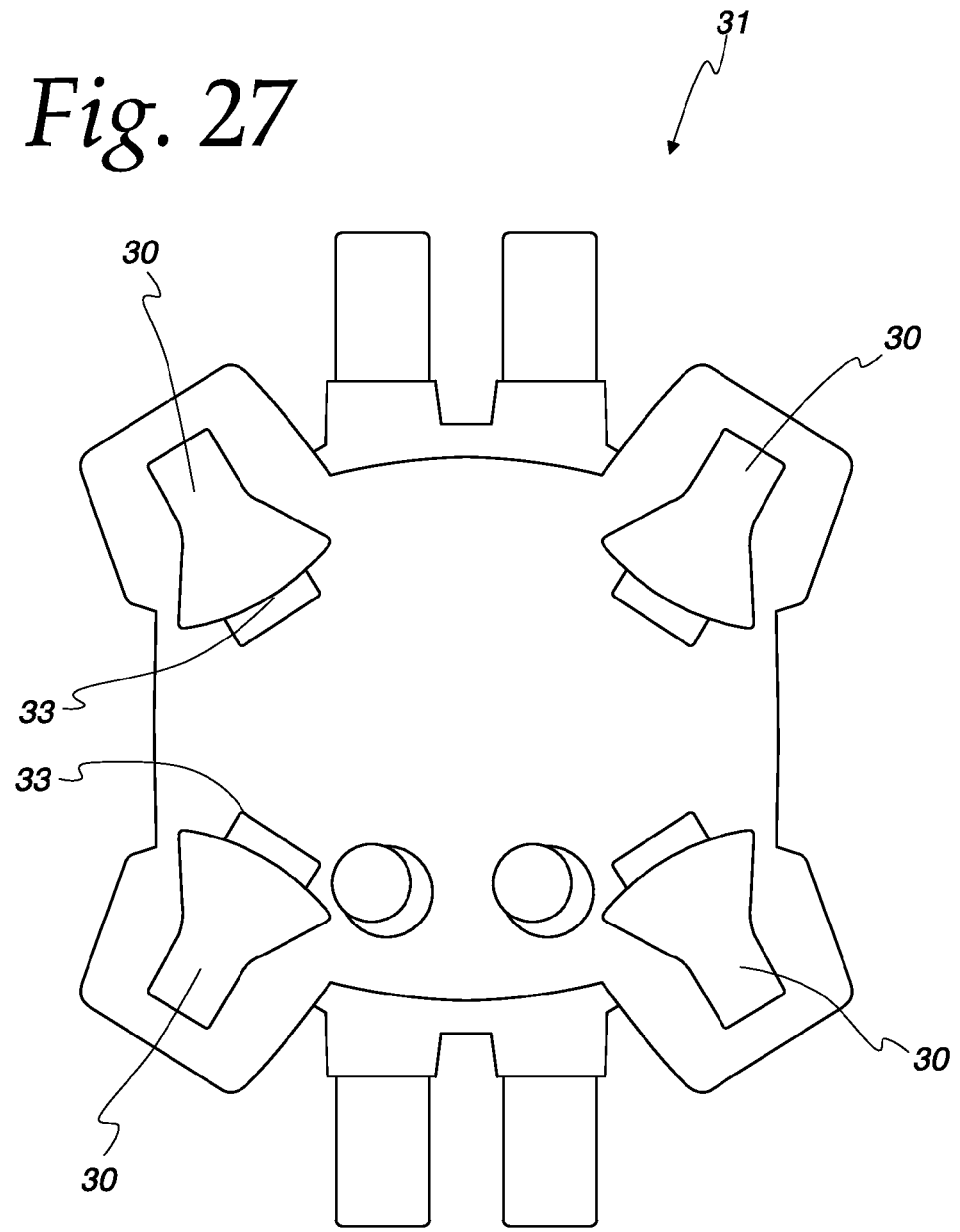
FIG. 27 shows a carrying body.

FIGS. 24 to 26 illustrate an exemplary embodiment of a clamping jaw 8. The clamping jaw 8 has a reception space 25 which serves for receiving at least part of a clamping body. The reception space has a shape which is adapted to the shape of the clamping body. It is clear from the illustration in FIGS. 27 and 28 that the clamping jaw 8 has a projection 26 which, in the mounted state, engages into a corresponding recess which, for example, may take the form of a groove 11. The projection 26 is of essentially wedge-shaped design in the exemplary embodiment illustrated.

The clamping jaw 8 has a perforation 27. The perforation 27 is designed such that it is adapted to the outer contour of a milk tube. In the mounted state, a milk tube extends through the perforation 27. The shape and configuration of the perforation 27 influence the position of the milk tube in relation to the milk collection piece. In the exemplary embodiment illustrated, the perforation 27 is of essentially C-shaped design. The milk tube can be led through the open side of the C-shaped perforation 27, so that the clamping body can engage into the reception space 25 of the clamping jaw 8. The mounting of the clamping jaw 8 together with the milk tube which has a clamping body is thereby simplified.

The clamping jaw 8 can be connected to a carrying body by means of a releasable latching connection. The clamping jaw 8 has on its top side a depression 28 which delimits a connecting element 29. The connecting element 29 engages into a corresponding receptacle of a carrying body. The receptacle is designated by reference symbol 30 in FIG. 27 which illustrates the carrying body 29. It is clear from the illustration in FIGS. 24 and 26 that a latching element 32 is provided which co-operates with a correspondingly designed latching means 33 of the carrying body 31. The latching connection is designed releasably so that the carrying body 31 can be provided with differently formed clamping jaws 8.

Figure 28:
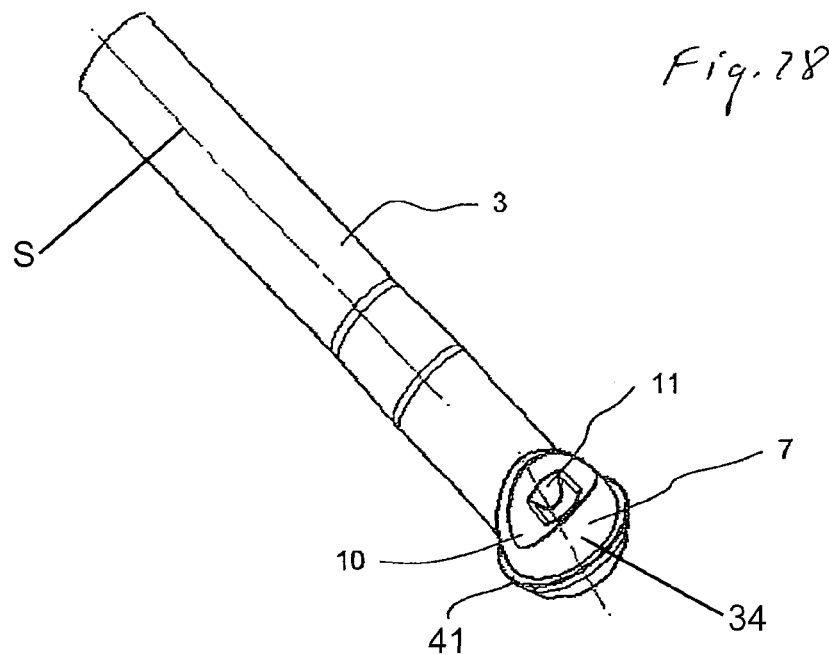
FIG. 28 shows in a perspective view a further exemplary embodiment of a milk tube.
Figure 29:
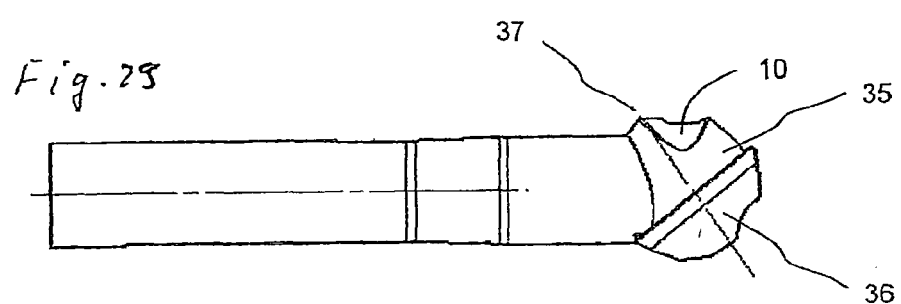
FIG. 29 shows the milk tube according to FIG. 28 in a side view.
Figure 30:
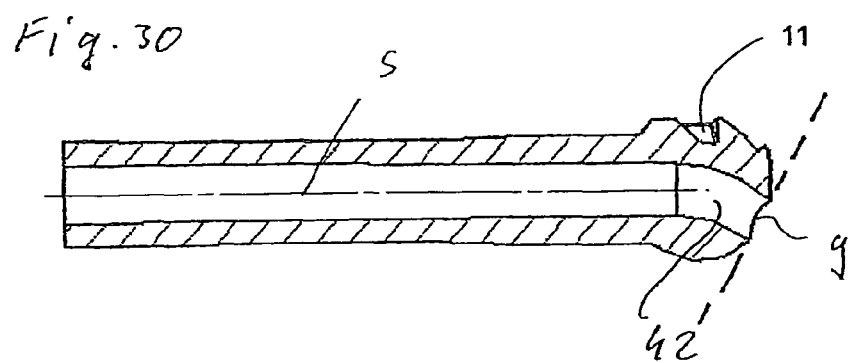
FIG. 30 shows the milk tube according to FIG. 28 in section.

FIGS. 28 to 30 show a further exemplary embodiment of a milk tube 3. The milk tube 3 has a clamping body 7. In the exemplary embodiment illustrated, the clamping body 7 is of two-part design. It has an upper spherical cap part 35 and a lower spherical cap part 36. It is clear from the illustration particularly according to FIG. 31 that the diameter of the spherical cap part 35 is smaller than the diameter of the lower spherical cap part 36 so that a margin 41 is formed. The axes of the two cap parts 35, 36 lie on one common straight line. It can be seen from the illustration according to FIG. 31 that the parting plane between the two spherical cap parts 35, 36 or the margin 41 is inclined at an angle with respect to the longitudinal axis S of the milk tube.

It can be gathered, further, from the illustration according to FIG. 30 that the outlet 9 of the duct 42 lies in a plane which is penetrated by the longitudinal axis S of the milk tube at an angle different from 90°. The imaginary plane is illustrated by dashes in FIG. 30.

Figure 31:
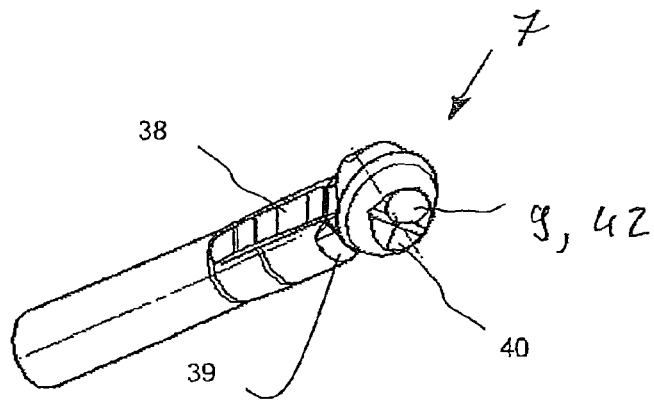
FIG. 31 shows in a perspective view a further embodiment of a milk tube.
Figure 32:
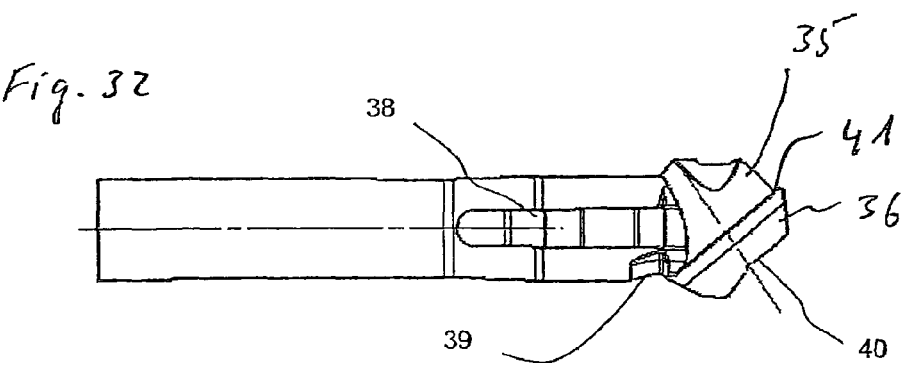
FIG. 32 shows the milk tube according to FIG. 31 in a side view.
Figure 33:
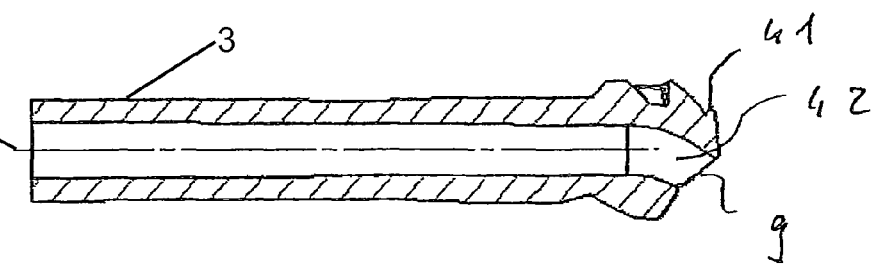
FIG. 33 shows a sectional view of the milk tube according to FIG. 31.

Yet a further exemplary embodiment of a milk tube 3 may be gathered from FIGS. 31 to 33. The basic set-up of the milk tube 3, as illustrated in FIGS. 31 to 33, corresponds essentially to the set-up of the milk tube 3 according to FIGS. 28 to 30.

The embodiment, as illustrated in FIGS. 31 to 33, differs from the exemplary embodiment, as illustrated in FIGS. 28 to 30, in that the milk tube has adjacently to the clamping body 7 radially outward-directed projections 38 which extend from the clamping body 7 over part of the length of the milk tube 3. Preferably two projections 38 are provided which are formed so as to be offset at 180° with respect to one another. The projections 38 essentially prevent a bending of the milk tube 3 in the region where the projections are located. The wall thickness in the region of the projections is greater than in the other region of the milk tube, with the result that the rigidity of the milk tube is further increased in this region. Other measures may also be expedient.

It can be seen, further, from the illustration in FIGS. 31 to 33, that a notch 39 is provided adjacently to the lower spherical body 36. By means of this notch 39, possible deformations which may occur due to bending or pulling are restricted to the region of the notch. What is achieved by this notch is that a deformation is not introduced into the clamping body, this being advantageous particularly when the clamping body together with the milk tube is formed integrally from one material. By the avoidance of deformation introduced into the clamping body, this also prevents the sealing surfaces of the clamping body 7 from being deformed, and therefore increased leak tightness is achieved.

It is clear from FIGS. 31 and 33 that a clearance 40 is provided in the clamping body 7 in the region of the outlet 9. The clearance 40 ensures that, for example during a flushing operation, and depending on the position of the milk tube in relation to the milk collection piece, no cleaning fluid is left behind in the milk collection piece, but, instead, would flow back into the milk tube. The clearance 40 ensures that cleaning fluid can flow into the milk tube irrespective of the position of the clamping body in relation to a milk collection piece.

What is claimed:
1. A milking unit comprising:
a plurality of milk hoses, each milk hose having a first end section and a second end section, and a substantially spherical clamping element integrally joined to the first end section;
a milk collecting component having a plurality of coupling elements, and each coupling element includes a clamping jaw shaped to mate with a corresponding clamping element of a milk hose; and
a clamping unit releasably secured to the first end section of at least one milk hose to exert a force on the clamping element to set and secure an orientation of the at least one milk hose first end section at a fixed angle relative to a vertical plane and create an essentially fluid-tight connection between the milk hose clamping element and the milk collecting component coupling element.

2. The milking unit according to claim 1, wherein the first end section of at least one milk hose has an outer surface shaped to substantially correspond to a shape of a corresponding coupling element.

3. The milking unit according to claim 1, wherein at least one milk hose is oriented at an angle to the milk collecting component and is releasably connected to the milk collecting component in a predetermined orientation.

4. The milking unit according to claim 1, wherein at least one milk hose is selectively oriented relative to the milk collecting component.

5. The milking unit according to claim 1, wherein at least one milk hose is selectively oriented relative to the milk collecting component and releasably connected to the milk collecting component in the selected orientation.

\* \* \* \* \*